US008141633B2

(12) United States Patent
Hampton et al.

(10) Patent No.: US 8,141,633 B2
(45) Date of Patent: Mar. 27, 2012

(54) DETECTING FLUIDS IN A WELLBORE

(75) Inventors: David W. Hampton, Houston, TX (US);
Robert C. Kramm, Houston, TX (US)

(73) Assignee: Occidental Chemical Corporation,
Dallas, TX (US)

( * ) Notice: Subject to any disclaimer, the term of this patent is extended or adjusted under 35 U.S.C. 154(b) by 325 days.

(21) Appl. No.: 12/411,145

(22) Filed: Mar. 25, 2009

(65) Prior Publication Data

US 2010/0243241 A1 Sep. 30, 2010

(51) Int. Cl.
*E21B 49/08* (2006.01)
*G01V 5/08* (2006.01)
(52) U.S. Cl. .................. 166/250.12; 250/256; 250/259; 250/269.1
(58) Field of Classification Search ............. 166/250.12; 250/256, 259, 269.1, 269.2; 382/109
See application file for complete search history.

(56) References Cited

U.S. PATENT DOCUMENTS

| | | | |
|---|---|---|---|
| 4,696,903 A * | 9/1987 | Owen .............................. 436/28 |
| 5,084,617 A | 1/1992 | Gergely | |
| 5,912,459 A | 6/1999 | Mullins et al. | |
| 6,075,611 A | 6/2000 | Dussan et al. | |
| 6,355,928 B1 | 3/2002 | Skinner et al. | |
| 6,564,866 B2 | 5/2003 | Clark et al. | |
| 6,645,769 B2 | 11/2003 | Tayebi et al. | |
| 6,659,175 B2 | 12/2003 | Malone et al. | |
| 6,704,109 B2 | 3/2004 | Wu et al. | |
| 6,799,634 B2 | 10/2004 | Hartog et al. | |
| 6,850,317 B2 | 2/2005 | Mullins et al. | |
| 7,032,662 B2 | 4/2006 | Malone et al. | |
| 7,337,660 B2 | 3/2008 | Ibrahim et al. | |
| 2002/0066309 A1 | 6/2002 | Tubel et al. | |
| 2007/0120051 A1 | 5/2007 | Di Foggio et al. | |
| 2008/0037006 A1* | 2/2008 | Canas Triana et al. ......... 356/73 |
| 2008/0173805 A1* | 7/2008 | Indo et al. .................. 250/269.1 |

OTHER PUBLICATIONS

Notification of Transmittal of the International Search Report and the Written Opinion of the International Searching Authority, or Declaration (3 pages); International Search Report (5 pages); and Written Opinion of the International Searching Authority (13 pages), mailed Sep. 28, 2010, for related international application PCT/US2010/028640.

Notification of Transmittal of the International Search Report and the Written Opinion of the International Searching Authority, or Declaration (3 pages); International Search Report (5 pages); and Written Opinion of the International Searching Authority (8 pages), mailed Aug. 2, 2010, for related international application PCT/US2010/028640.

* cited by examiner

*Primary Examiner* — Giovanna Wright
(74) *Attorney, Agent, or Firm* — Renner Kenner

(57) ABSTRACT

In one general implementation, a method for identifying fluids in a wellbore includes generating light in a visible spectrum from a light source in a production wellbore; generating light in an ultraviolet spectrum from the light source in the production wellbore; receiving a first fluid in the production wellbore from a subterranean zone; receiving a second fluid in the production wellbore from the subterranean zone; capturing at least one image of a combined flow of the first fluid and the second fluid in at least one of the visible spectrum and the ultraviolet spectrum with an optical receiver in the production wellbore; and distinguishing, at least in part through the image, the first fluid from the second fluid in either or both the visible and ultraviolet spectrums.

24 Claims, 5 Drawing Sheets

DETECTING FLUIDS IN A WELLBORE

TECHNICAL BACKGROUND

This disclosure relates to wellbore equipment and, more particularly, to downhole tools used for detecting fluids at a well site and in wellbores.

BACKGROUND

Secondary production of existing oil and gas wells may help increase the output of hydrocarbons (e.g., oil and gas) from a subterranean zone. Injection wells are drilled and used to introduce fluids into the subterranean zone into which a production well may be drilled. The injected fluids may increase or maintain hydrocarbon production from the production well. Areal interaction between injection and production wells are impacted by the heterogeneity of the rock, which can result in less than ideal sweep and production performance. For example, "short circuits" between injection wells and production wells may occur. In the present disclosure, a "short-circuit" may be any path that provides preferential flow to the injectant and allows communication between an injection well and a production well, such that a significant fraction of the formation is poorly to not processed by the injectant due to this preferential passage. The short circuit may provide significantly higher permeability than the matrix of the geologic zone in which it is located. These short circuits typically reduce the hydrocarbon displacement efficiency of the injected fluid. While short circuits may typically result from geologic features (e.g., karsts, fissures, faults, and natural fractures), they are sometimes the result of man-made actions (e.g., dissolution of fracture lining salts, stimulations, and hydraulic fracture treatments). All of which may provide a significantly higher permeability than the surrounding subterranean zone.

There may sometimes be difficulties with short circuit analysis. For instance, multiple flow paths may exist between injection wells and production wells, each having a distinct response time and rate, which can overlap and confuse analysis of the production and injection responses. Short-circuits may also exist between one injector-producer pair or several different wells. A short circuit between an injection well and a production well may account for a small fraction of the total open interval in the wellbores, and yet could account for a disproportionate share of the total fluid flowing through the subterranean zone and produced to the surface by the production well. In such cases, the injected fluids flow quickly from injector to producer contacting little oil, which consequently results in loss of revenue and, ultimately, lower hydrocarbon recovery. Frequently, the produced fluids are re-injected into the same zones, setting up a cycle where the injected fluids are increasingly less able to displace oil (cycling of injected fluids).

In some instances, production logging techniques may be utilized in an attempt to identify short circuits. Production logging includes numerous documented techniques for performing downhole identification of fluid entry into a wellbore. In general, production logging techniques may involve inferred values where a group of parameters are measured in a production well, such as capacitance, velocity, density, temperature, and pressure, and the data is combined to evaluate the percentages of each phase of the fluid in the well bore, as well as flow rate of the fluids along the wellbore. The path by which the injected fluids arrive at the production well may be inferred based on the incremental flow rates along the wellbore.

SUMMARY

In one general implementation of the present disclosure, a method for identifying fluids in a wellbore includes generating light in a visible spectrum from a light source in a production wellbore; generating light in an ultraviolet spectrum from the light source in the production wellbore; receiving a first fluid in the production wellbore from a subterranean zone; receiving a second fluid in the production wellbore from the subterranean zone; capturing at least one image of a combined flow of the first fluid and the second fluid in at least one of the visible spectrum and the ultraviolet spectrum with an optical receiver in the production wellbore; and distinguishing, at least in part through the image, the first fluid from the second fluid in either or both the visible and ultraviolet spectrums.

In some specific implementations, generating light in a visible spectrum from a light source in a production wellbore may include generating light in a visible spectrum from a first light source in a production wellbore. Further, generating light in an ultraviolet spectrum from the light source in the production wellbore may include generating light in an ultraviolet spectrum from a second light source in the production wellbore. The method may further include transmitting me image from the optical receiver for presentation at the surface whereby it is visible to an operator. In addition, in some implementations, receiving a first fluid in the production wellbore and receiving the second fluid in the production wellbore may include receiving the combined flow of the first fluid and the second fluid in the production wellbore at a first communication interval. In some aspects of the general implementation, distinguishing, at least in part through the image, the first fluid from the second fluid in the ultraviolet spectrum, may include quantifying, based on the at least one image, an amount of the first fluid or the second fluid in the combined flow of the first and second fluids in the production wellbore. Quantifying, based on the at least one image, an amount of the first fluid or the second fluid in the combined flow of the first and second fluids in the production wellbore may include transmitting a plurality of images of the mixture of the first and second fluids to a processor located at or near the surface; and calculating, with the processor, an amount of the first fluid in the combined flow according to the plurality of images.

In certain implementations, the method may further include instigating a remedial action based at least in part on the quantification. Instigating a remedial action may include at least one of the following: isolating the first communication interval in the production wellbore from a remaining portion of the production wellbore; and substantially preventing the receipt of the second fluid at the production wellbore. In some implementations, isolating the first communication interval in the production wellbore from a remaining portion of the production wellbore may include inserting at least one packer into the production wellbore; setting the packer into the production wellbore proximate to the first communication interval in the production wellbore; and at least partially isolating the first communication interval from the remaining portion of the production wellbore with the packer.

In specific aspects of the general implementation, the second fluid may be at least one of water, carbon dioxide, nitrogen, or hydrocarbon gas and the first fluid may be a hydrocarbon fluid. The method may further include targeting the optical receiver for a fluorescent spectrum of the second fluid. Further, capturing at least one image of the combined flow of the first fluid and the second fluid may include capturing a digital video image of the combined flow of the first fluid and the second fluid.

In another general implementation of the present disclosure, a downhole wellbore apparatus includes a light source that generates light in a visible spectrum in a wellbore and light in an ultraviolet spectrum in the wellbore; and an optical receiver that captures at least one image in the visible spectrum of a mixture of a first fluid and a second fluid in the wellbore, where the optical receiver adapted to distinguish, at least in part through the image, the first fluid from the second fluid in the ultraviolet spectrum.

In some specific implementations, the light source that generates light in a visible spectrum may be a first light source, where the apparatus may further include a second light source that generates light in an ultraviolet spectrum in the wellbore. Additionally, the optical receiver may be further adapted to transmit the at least one image to a processor located at or near the surface. The optical receiver may also include a digital video camera adapted to capture a plurality of images in the visible spectrum or ultraviolet spectrum of the mixture of the first fluid and the second fluid in the wellbore.

In certain specific implementations of the apparatus, the first fluid may include a hydrocarbon and the second fluid may include a tracer fluid and at least one of water, carbon dioxide, or nitrogen, where the hydrocarbon includes a first fluorescence and the tracer dye includes a second fluorescence. Further, the at least one image may distinguish the first fluorescence from the second fluorescence.

In another general implementation, a system for identifying communication paths between wellbores includes: a production wellbore extending from a surface to a subterranean zone; at least one injection wellbore extending from the surface to the subterranean zone; a marking fluid communicable from the injection wellbore to the production wellbore through the subterranean zone; and a downhole tool adapted to be inserted into the production wellbore. The downhole tool includes a first light source that generates light in a visible spectrum; a second light source mat generates light in an ultraviolet spectrum; and an optical receiver that captures at least one image in the visible spectrum of a mixture of a hydrocarbon fluid and the marking fluid in the production wellbore, where the optical receiver is adapted to distinguish, at least in part through the image, the hydrocarbon fluid from the marking fluid in the ultraviolet spectrum.

In some specific implementations, the system may further include a processor located at the surface, where the downhole tool may be adapted to transmit the image to the processor. The processor may be adapted to quantify, based on the image, an amount of the hydrocarbon fluid or the marking fluid in the mixture of the hydrocarbon fluid and the marking fluid in the production wellbore. Further, the optical receiver may include a digital video camera adapted to capture a plurality of video images in the visible spectrum or ultraviolet spectrum of the mixture of the hydrocarbon fluid and the marking fluid in the production wellbore. The hydrocarbon fluid may emit a first fluorescence and the marking fluid may emit a second fluorescence. The image may distinguish the first fluorescence from the second fluorescence.

In another general implementation, a method for identifying fluids includes: generating light in a visible spectrum from a light source at a surface site for hydrocarbon production; generating light in an ultraviolet spectrum from the light source at the surface site; receiving a first fluid at the surface site from a production wellbore; receiving a second fluid at the surface site from the production wellbore; capturing at least one image of a combined flow of the first fluid and the second fluid in at least one of the visible spectrum and the ultraviolet spectrum with an optical receiver at the surface site; distinguishing, at least in part through the image, the first fluid from the second fluid in either or both the visible and ultraviolet spectrums; qualitatively determining, based on the at least one image, an amount of the first fluid or the second fluid in the combined flow of the first and second fluids; and based on the amount, inserting the light source and the optical receiver into the production wellbore. In certain specific implementations of the method, inserting the light source and the optical receiver into the production wellbore based on the amount may include comparing the amount to a predetermined threshold value of the first fluid of the second fluid in the combined flow of the first and second fluids; and inserting the light source and the optical receiver into the production wellbore if the amount of the first fluid or the second fluid exceeds the threshold value.

In another general implementation of the present disclosure, a method for identifying fluids in wellbores includes generating light in an ultraviolet spectrum from a light source in a production wellbore; receiving a first fluid in the production wellbore from a subterranean zone; receiving a second fluid in the production wellbore from the subterranean zone; capturing at least one image of a combined flow of the first fluid and the second fluid in the ultraviolet spectrum with an optical receiver in the production wellbore; and distinguishing, at least in part through the image, the first fluid from the second fluid in the ultraviolet spectrums.

Various implementations of a downhole fluid detector according to the present disclosure may include one or more of the following features. For example, the detector may allow identification of where fluids enter a wellbore. The detector may also allow identification of a source and/or path of communication between an injection well and a production well. The detector may also allow differentiation between the fluorescence of hydrocarbons entering a wellbore and the fluorescence of tracers/dyes injected into an offset injection well with the injected fluid used to displace hydrocarbons in enhanced recovery operations. As a further example, the downhole fluid detector may allow diagnostics to be performed on a producing well to determine which interval of a well is producing hydrocarbons and which interval is producing an injected fluid. The detector may thus indicate when and where remedial actions should be taken to correct short circuits between injectors and producers without damaging the hydrocarbon producing interval. Further, the detector may substantially prevent extensive cycling of the injected fluid, which may result in decreased loss of revenue and greater hydrocarbon recovery. Additionally, the downhole fluid detector may reduce the uncertainty of production profile analysis in mature hydrocarbon producing zones. The detector may also improve a success rate for "profile control" work involving shutting off an injectant (e.g., water, nitrogen, or gas) used in enhanced recovery operations.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

One implementation of a downhole fluid detector includes a visible spectrum light source and an ultraviolet light source along with an optical receiver that, when lowered into a production wellbore, can produce video and still images of a fluid entering a wellbore under both light spectrums. The downhole fluid detector may distinguish between the produced fluids by observed differences in the fluorescence of hydrocarbons entering the production wellbore and the fluorescence of a tracer injected with the injected fluid into an offset injection well. A quantification of the amount of hydrocarbons relative to the injected fluid being received at any particular communication interval, or production zone, of the wellbore may be performed. This quantification may help indicate when remedial action should be taken to correct "short circuits" between the injection well and the production well, as well as where within the producing well to minimize damage to other hydrocarbon-producing intervals.

Figure 1:
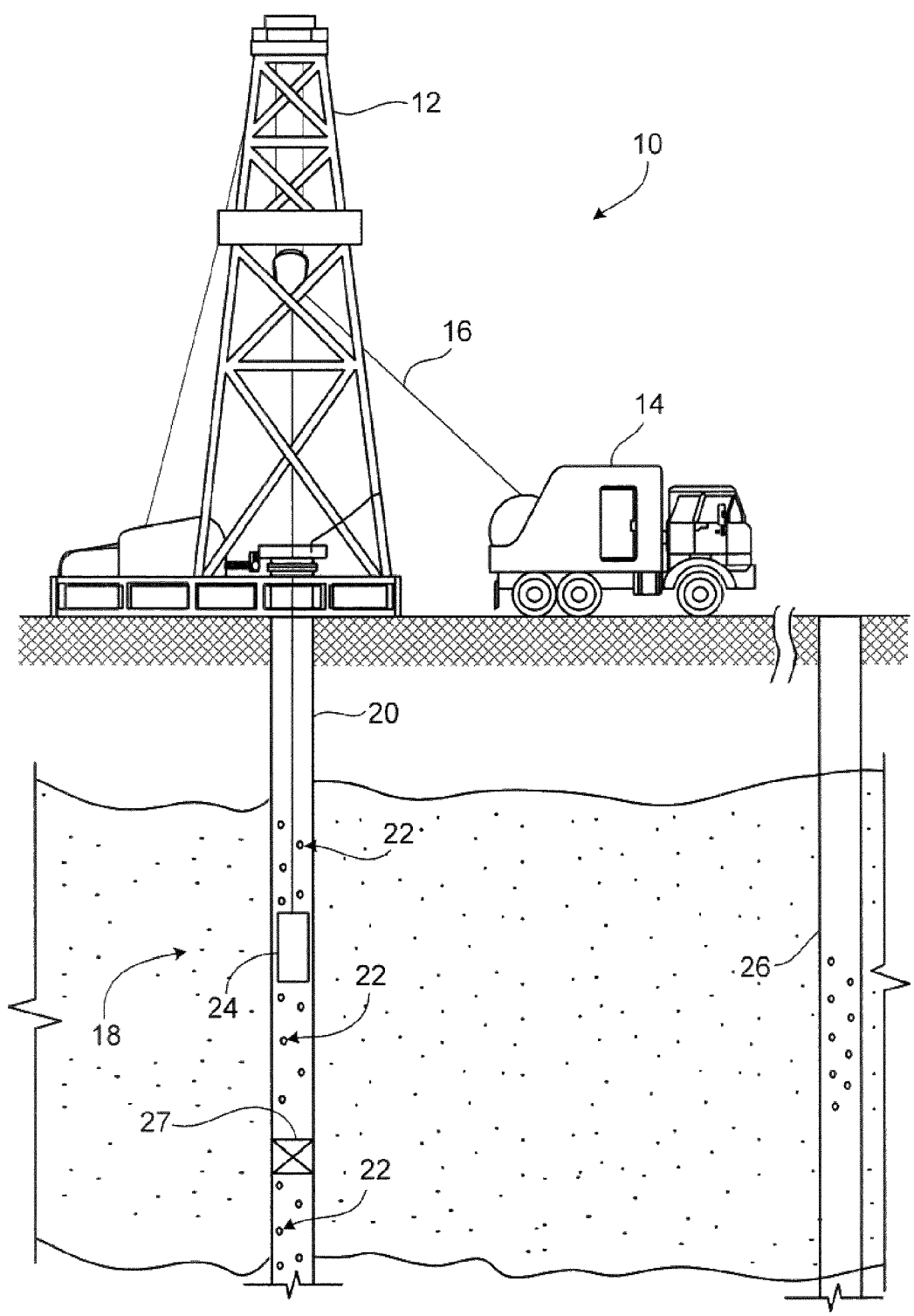
FIG. 1 illustrates one example of a well system which may utilize a downhole fluid detector in accordance with the present disclosure.

FIG. 1 illustrates one example of a well system 10 which may utilize one or more implementations of a downhole fluid detector in accordance with the present disclosure. Well system 10 includes a rig 12, a wireline truck 14, a wireline 16 (e.g., slickline, braided line, or electric line), a production wellbore 20, a downhole fluid detector 24, and an injection wellbore 26. Rig 12, generally, provides a structural support system and drilling equipment to create or work in vertical or directional wellbores in sub-surface zones. In some embodiments, the rig 12 may be, for example, a drilling rig, workover rig, or wireline mast unit. As illustrated in FIG. 1, rig 12 may create production wellbore 20 in a subterranean formation 18. Production wellbore 20 may be a cased or open-hole completion borehole. Subterranean formation 18 is typically a petroleum bearing formation, such as, for instance, sandstone, carbonate, or coal, as just a few of many examples. Once the production wellbore 20 is formed, wireline truck 14 may be utilized to insert the wireline 16 into the wellbore 20. The wireline 16 may be utilized to lower and suspend one or more of a variety of different downhole tools in the production wellbore 20 for wellbore maintenance, logging, completion, workover, fluid detection, and other operations. In some instances, a tubing string (not shown) may be alternatively, or additionally, utilized in lowering and suspending the downhole tools in the production wellbore 20. The downhole tools can include one or more of perforating tools (e.g., perforating guns), setting tools, sensor initiation tools, hydro-electrical device tools, pipe recovery tools, and/or other tools.

In the present disclosure, a downhole tool set may include downhole fluid detector 24. The downhole fluid detector 24 may be lowered into the production wellbore 20 by the wireline 16. In the depicted implementation, the wireline 16 is the transmission path and downhole fluid detector 24 may be actuated, controlled, exchange data, or otherwise communicate with a computer or other processing device located in the wireline truck 14, by one or more signals over the wireline 16. Alternatively, the downhole fluid detector 24 may communicate with any other appropriate computer or processing device located at the surface using any of a variety of transmission paths (e.g., electrical, fiber optic or other type of communication line carried apart from the wireline 16, electrical, fiber optic or other type of communication line carried in or on tubing, or other transmission paths).

The well system 10 also includes one or more injection wellbores 26 drilled from the surface into the subterranean zone 18 and offset from the production wellbore 20. The injection wellbore 26, typically, provides a path through which an injectant (e.g., water, $CO_2$, natural gas, nitrogen, a hydrocarbon fluid, and/or chemicals) may be introduced into the subterranean zone 18 for secondary hydrocarbon recovery operations. The injectant may, in part, force hydrocarbons remaining in the subterranean zone 18 to the production wellbore 20 and/or dissolve in liquid hydrocarbons to lower its viscosity and increase its volumetric flow rate. The injection wellbore 26 may also provide a path through which a fluid tracer (e.g., fluorescent dye) may be introduced into the subterranean zone 18 simultaneous with or proximate with the injectant. The tracer, in some aspects, may fluoresce a different color in an ultraviolet spectrum as compared to hydrocarbons located in the subterranean zone 18.

Production wellbore 20 may be in fluid communication with the injection wellbore 26 within the subterranean zone 18 through one or more communication intervals 22. Generally, each of the communication intervals 22 may include one or more sets of perforations formed in the production wellbore 20. The perforation sets may be formed, for example, by perforating tools including single guns, dual fire guns, or multiple selections of selectable fire guns, to name a few. Each perforation set may allow for fluid from the subterranean zone 18, such as hydrocarbons, injectants, and tracers, to enter the production wellbore 20 and eventually be removed from the zone 18 to the surface. Alternatively, the production wellbore 20 may be completed as an open-hole completion, or open-hole gravel pack, however a communication path exists by which the injectant and tracer may enter the wellbore from zone 18, and be produced to the surface. Embodiments of the downhole fluid detector 24 may be utilized in any completion wellbores, with or without defined perforation sets.

Removal of the fluids from the production wellbore 20 may typically be accomplished through one or more techniques, such as natural flow from the wellbore or a gas lift system. In some embodiments, alternatively, positive displacement pumping with a rod sucker pump or an electric submersible pump may be used. In the case of a positive displacement pump, the wellbore configuration may include some method of transit whereby the downhole fluid detector 24 can monitor or log the wellbore proximate to the producing zones 18.

In some implementations, such as when injectant from the injection wellbore 26 is removed from the production wellbore 20 in the absence of substantially any hydrocarbons (e.g., a short circuit scenario), one or more packers or plugs 27 may be inserted into the production wellbore 20. The plug 27 may be positioned in the production wellbore 20 to substantially seal one or more communication intervals 22 from the remaining portion of the production wellbore 20. Thus, fluid flowing into the wellbore 20 (i.e., injectant) may be substantially prevented or cease to be removed from the production wellbore 20.

As illustrated in FIG. 1, the injection wellbore 26 may include one or more perforation sets. Each perforation set formed in this wellbore 26 may allow fluid injectant and/or tracer to be introduced from the surface into the subterranean zone 18. In particular, fluid injectant and/or tracer introduced into the subterranean zone 18 through the injection wellbore 26 and removed from the subterranean zone 18 via the production wellbore 20 may be recycled and reinjected into the injection wellbore 26. For example, a fluid mixture removed from the production wellbore 20 consisting of hydrocarbons, injectant, and tracer may be separated at the surface. Once the mixture is substantially separated into the distinct components of hydrocarbons, injectant, and tracer, the injectant may be reintroduced into the injection wellbore 26 while the hydrocarbons are, typically, placed into a pipeline for use or sale.

Figure 2:
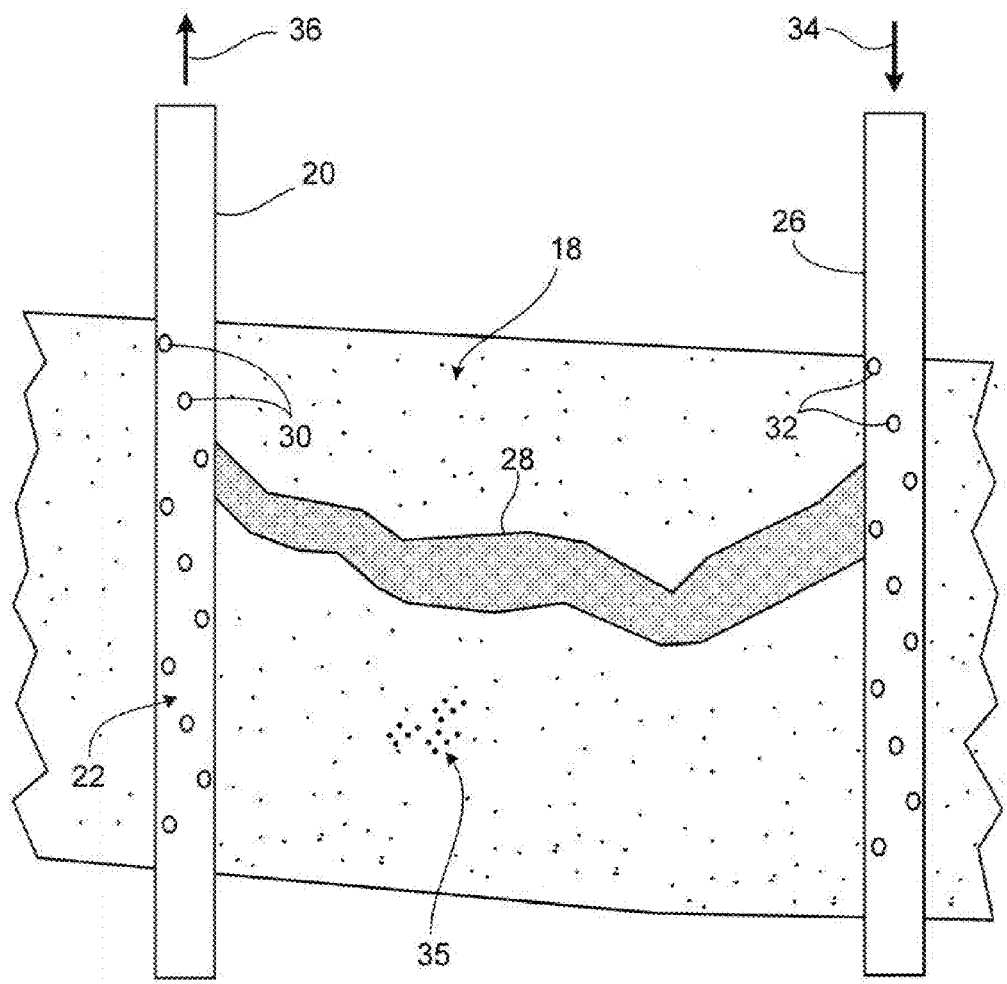
FIG. 2 illustrates one example of an injection wellbore in fluid communication with a production wellbore in accordance with the present disclosure.

FIG. 2 illustrates one example of an injection wellbore, such as the injection wellbore 26 in fluid communication with a production wellbore, such as the production wellbore 20, in accordance with the present disclosure. More specifically, FIG. 2 illustrates the injection wellbore 26 in fluid communication with the production wellbore 20 through a communication path 28 within the subterranean zone 18. The communication path 28 may be a naturally existing path through the geologic matrix of the subterranean zone 18, or may have been created by man-made techniques. For example, the communication path 28 may exist between the injection wellbore 26 and the production wellbore 20 through the natural geologic features (e.g., karsts, fissures, faults, and natural fractures) of the subterranean zone 18, which may contain hydrocarbons 35.

Alternatively, the communication path 28 may be a short circuit between the injection wellbore 26 and the production wellbore 20. As previously noted, a short-circuit may be any path that provides preferential flow to the injectant and allows communication between an injection well and a production well, such that a significant fraction of the formation is poorly to not processed by the injectant due to this preferential passage. Here, the short circuit may provide significantly higher permeability than the matrix of the zone 18. In some cases, multiple communication paths 28 can exist between the injection wellbore 26 and the production wellbore 20, and short circuits can account for one or more of such paths 28.

Injection mixture 34 may be introduced into the subterranean zone 18 through one or more perforations 32 formed in the injection wellbore 26. The injection mixture 34, in some aspects, is a fluid mixture of an injectant (e.g., water, $CO_2$, nitrogen, a hydrocarbon gas) and a tracer. The injectant, typically, may help separate hydrocarbons 35 existing in the subterranean zone 18 from the geologic formation of the zone 18. The tracer, typically, may be a dye, such as a fluorescent dye visible in the ultraviolet spectrum.

In some embodiments, the production wellbore 20 includes multiple perforations 30 within a communication interval 22. A number of perforations 30 within a particular section of the production wellbore 20 may make up the communication interval 22 and allow fluids, such as hydrocarbons 35 and the injection mixture 34, to enter the production wellbore 20. A production mixture 36, consisting of, for instance, the removed hydrocarbons 35 and the injection mixture 34, may be removed from the production wellbore 20 to the surface through various pumping methods. Alternatively, as noted above, there may be an absence of perforations 30 due to, for example, an open-hole completion wellbore 20. The communication interval 22, therefore, may be defined by a specified section of the wellbore 20.

Figure 3:
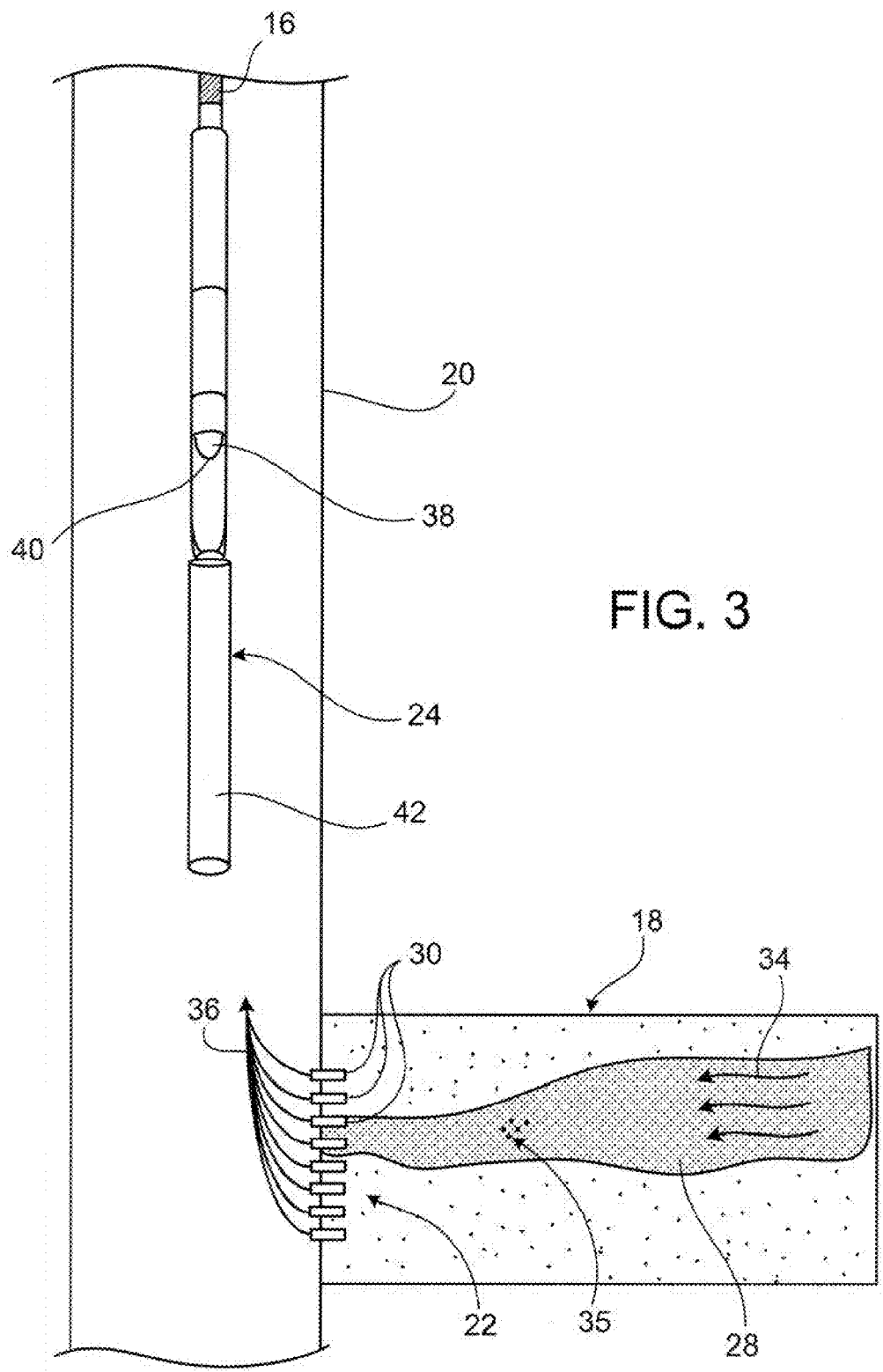
FIG. 3 illustrates one example of a downhole fluid detector in accordance with the present disclosure.

FIG. 3 illustrates one example of a downhole fluid detector 24 inserted into a production wellbore 20 in accordance with the present disclosure. The downhole fluid detector 24 is coupled to the wireline 16 and includes an ultraviolet light source 38, a visible light source 40 and an optical receiver 42. The ultraviolet light source 38 and the visible light source 40 may be incandescent, halogen, LEDs, or any other suitable light source. Further, in some implementations, the ultraviolet light source 38 and the visible light source 40 may be a single light source. Generally, the downhole fluid detector 24 may be lowered into the production wellbore 20 and may capture one or more images of the production mixture 36 entering the production wellbore 20 from the subterranean zone 18 through one or more perforations 30 or sections of the wellbore 20. The images may be video images (e.g., motion pictures) or still images. Further, the images may be digital or analog. The images are captured by the optical receiver 42 using one or both of the ultraviolet light source 38 and the visible light source 40. For example, in some implementations, the ultraviolet light source 38 may generate ultraviolet light (e.g., light with wavelengths between approximately 10 nanometers and 400 nanometers) in the production wellbore 20. Substantially simultaneously to the generation of ultraviolet light, the visible light source 40 may generate visible light (e.g., light with wavelengths greater than approximately 380 nanometers) in the production wellbore 20. In such implementations, the captured images may show the production mixture 36 in both visible and ultraviolet light.

In some implementations during secondary production operations, the downhole fluid detector 24 may operate to distinguish, at least in part, between the injection mixture 34 and hydrocarbons 35 in the production mixture 36 via the tracer in the injection mixture 34. Distinguishing between injection mixture 34 and hydrocarbons 35 based on the relative fluorescence of the hydrocarbons 35 and the injection mixture 34 may, in part, identify a short circuit between the injection wellbore 26 and the production wellbore 20. For example, the production mixture 36 may enter the production wellbore 20 at a particular communication interval 22 from the communication path 28. The production mixture 36 may, when the communication path 28 is a short circuit between the injection wellbore 26 and the production wellbore 20, have a significantly greater percentage of injection mixture 34 than hydrocarbons 35, for example. Depending on the amount of injection mixture 34 compared to hydrocarbons 35 in the production mixture 36, a well operator may decide to take one or more corrective actions to the secondary production operations. Such actions may include plugging at least a portion of the injection wellbore 26 to stop or substantially stop the flow of the injection mixture 34 into the injection wellbore 26 or substantially sealing the communication interval 22 from the remaining portion of the production wellbore 20 where the particular production mixture 36 is being received into the production wellbore 20.

Figure 4A:
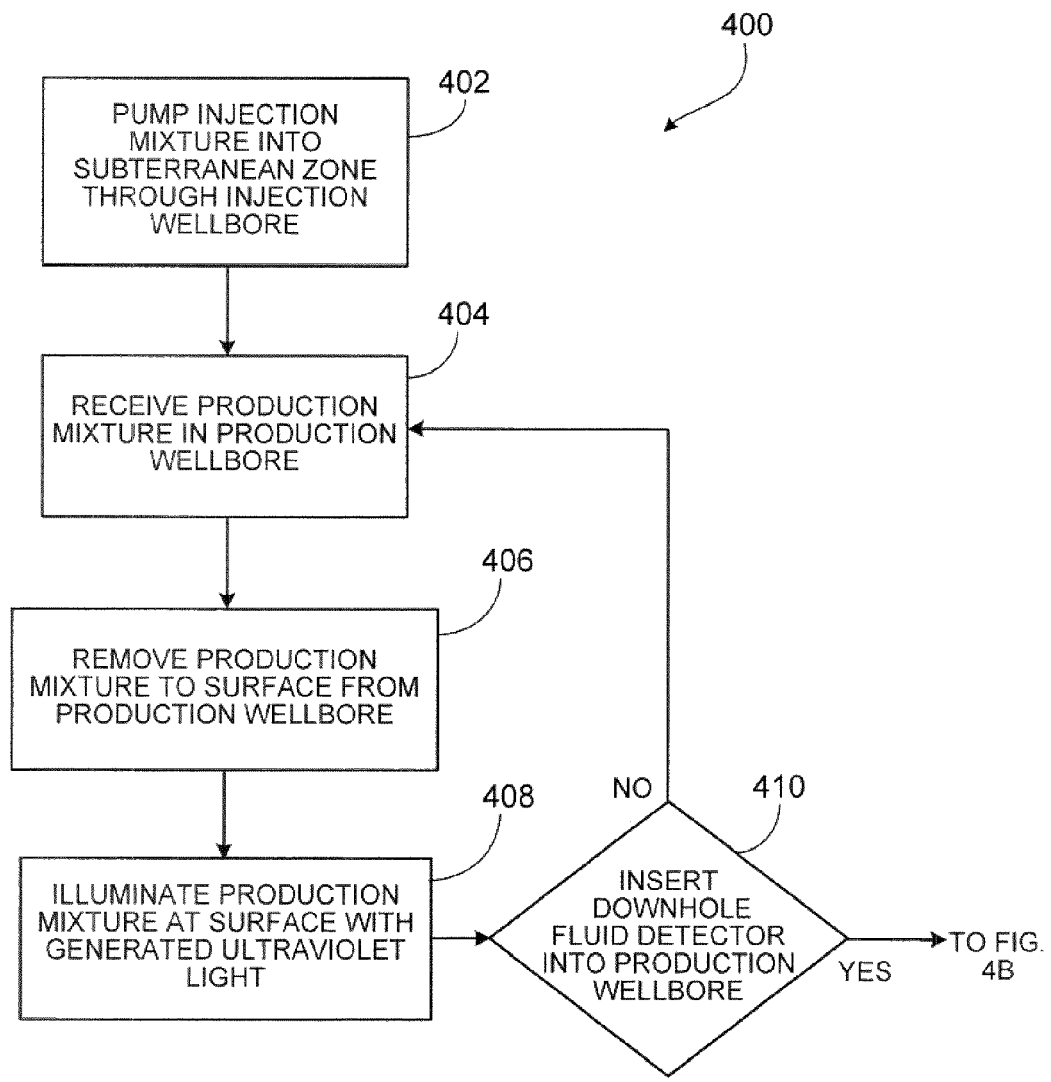
FIGS. 4A-B illustrate one example method of detecting fluids in accordance with the present disclosure.
Figure 4B:
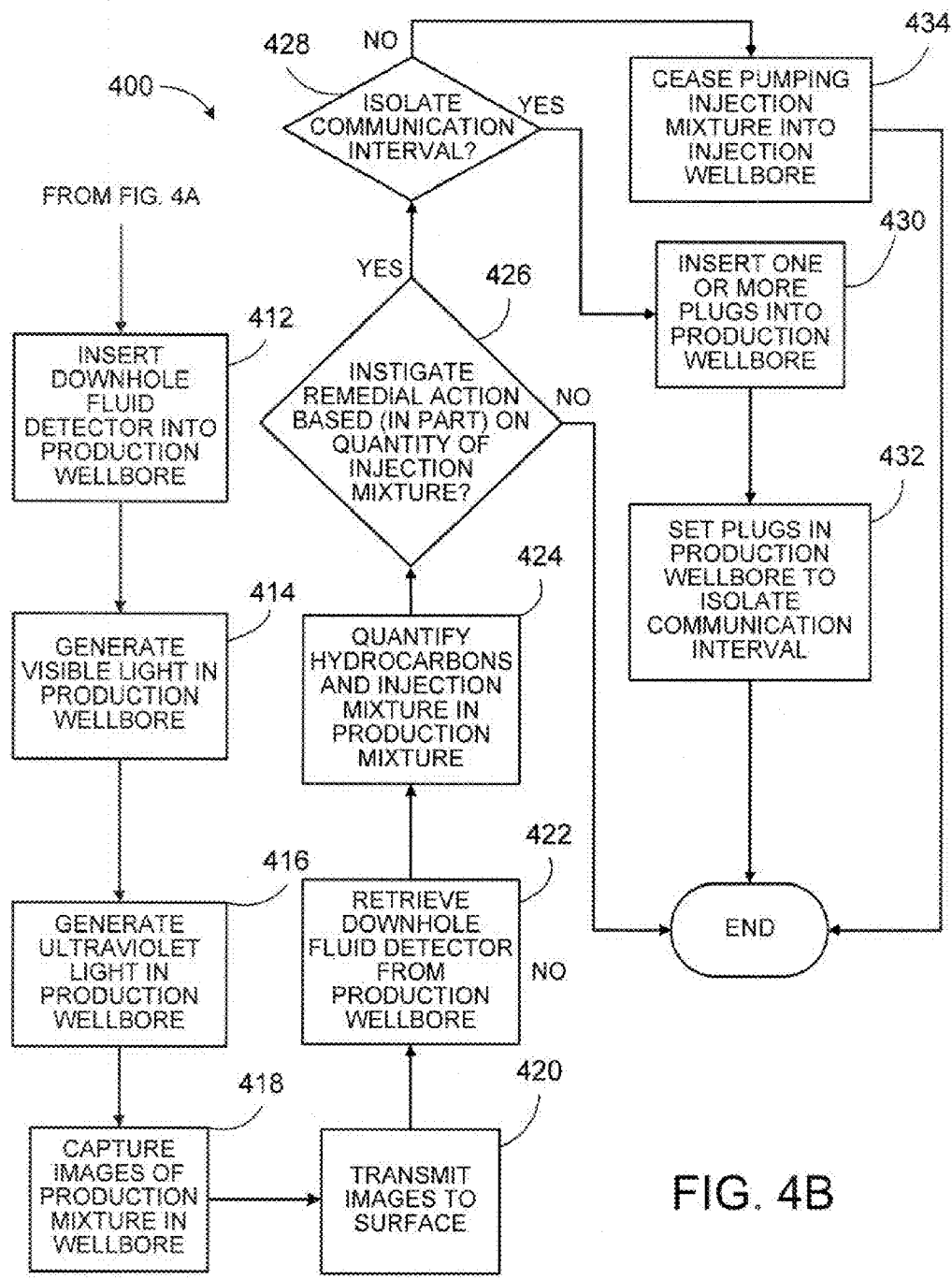

FIGS. 4A-B illustrate an example method 400 of detecting fluids in accordance with the present disclosure. Method 400 may be implemented by, for example, one or more components of the well system 10 as shown in FIG. 1. For instance, method 400 may be implemented with the rig 12, the wireline truck 14, the wireline 16, the production wellbore 20, the downhole fluid detector 24, and the injection wellbore 26, or alternatively, components substantially similar to these as described herein. Method 400, however, may be implemented by any appropriate combination of production components and downhole devices.

Method 400 may begin by pumping an injection mixture into a subterranean zone through an injection wellbore at 402. In some implementations of method 400, the injection mixture is a fluid mixture of injectant, such as water, $CO_2$, nitrogen and/or hydrocarbon gas and a tracer, such as a fluorescent dye. Typically, the injectant may be used in a secondary or tertiary (enhanced) production operation to separate hydrocarbons from the geologic formation, thereby allowing additional production of hydrocarbons beyond that of a primary production operation. The tracer may be a variety of fluids but generally, the fluorescence of the tracer differs from the fluorescence of the hydrocarbons in the subterranean zone. The introduction of the injection mixture into the subterranean zone instigates the secondary production and a production mixture of fluid is received in the production wellbore at 404. Instigation of secondary production into the production wellbore may not commence until days or even months after the injection mixture is introduced into the injection wellbore. The production mixture typically consists of hydrocarbons from the subterranean zone and the injection mixture. Also, the production mixture is received into the production wellbore through one or more communication intervals in the wellbore. Each communication interval may consist of one or more perforations or sets of perforations formed in the wellbore casing and extending into the geologic formation. Alternatively, the production wellbore may be an open hole completion without a casing or perforations. The production mixture, once received into the wellbore flows or is removed from the wellbore to the surface at 406.

At step 408, the production mixture may be analyzed at the surface in the ultraviolet spectrum. In some embodiments, the downhole fluid detector may be configured to illuminate the production mixture at the surface with light (e.g., light in the visible and/or ultraviolet spectrum). Alternatively, a separate tool or sensor may be utilized at the surface to illuminate the production mixture with light due to, for example, cost efficiency. Further, in some embodiments, alternatively, the production wellbore could be logged at regular and/or systematic intervals (i.e., every day, every week) until detection of the injection mixture occurs. In such embodiments, however, cost effectiveness of detecting the injection mixture in the production wellbore may be decreased significantly. At step 410, a determination is made whether to insert the downhole fluid detector into the production wellbore based, for instance, on the surface analysis of the production mixture. For example, presence of the injection mixture at the surface at a predetermined amount (e.g., some amount greater than zero) may provide that the downhole fluid detector should be inserted into the production wellbore. If the determination is made not to insert the downhole fluid detector, production mixture continues to be received in the production wellbore at 404.

Turning to FIG. 4B, based on an affirmative determination at step 410, the downhole fluid detector may be inserted into the production wellbore at 412 to "log" the wellbore (e.g., capture one or more of a series of "visual" measurements of the fraction of hydrocarbons and injection mixture entering the production wellbore in the visible and/or ultraviolet light spectrums). In some embodiments, the downhole fluid detector may be inserted to the greatest depth of the production wellbore and log the entire depth of the wellbore from the top of the wellbore to the bottom. Alternatively, the downhole fluid detector may be inserted into the wellbore at a particular communication interval (e.g., production zone) and subsequently moved to additional communication intervals, as needed. In other words a well operator may capture images with the downhole fluid detector at multiple stationary points (e.g., depths) within the production wellbore or the operator may capture a continuous video of fluid flow along the wellbore as the downhole fluid detector descends or ascends along an entire depth or a portion of the depth of the production wellbore. In some embodiments, both logging techniques may be utilized in a single logging run. Further, the operator may capture a series of images or video at prescribed depths, regardless of the relative percentage of hydrocarbons and injection mixture in the production mixture received into the production wellbore.

The downhole fluid detector typically includes an ultraviolet light source, a visible light source, and an optical receiver. Once inserted into the production wellbore, the downhole fluid detector may generate visible spectrum light in the production wellbore at 414. In the next step of example method 400, the downhole fluid detector generates ultraviolet light in the production wellbore at 416.

At 418, the downhole fluid detector captures one or more images of the production mixture as it is received into the production wellbore through the communication interval. In some implementations of the method 400, the images may be one or a series of still images. Alternatively, the images may be a streaming video image. In any event, the images may be captured in one or both of the visible light spectrum and ultraviolet light spectrum generated by the downhole fluid detector. Once captured, the images are transmitted to the surface at 420. For example, the images may be transmitted over a wireline to a wireline truck, a separate production control center, or any appropriate processing center. Generally, the images are transmitted to a processor (e.g., desktop or laptop computer, PDA or other handheld or wireless device, server, or combination of any of the foregoing). Alternatively, the images may be stored in the downhole fluid detector for later retrieval when the detector is removed to the surface.

At 422, the downhole fluid detector is removed to the surface. As noted above, in some embodiments, stored images may then be retrieved from the downhole fluid detector. Based on the retrieved images, the well operator may quantify the relative amounts of hydrocarbons and injection mixture present in the production mixture at 424. For example, the well operator may, by visual inspection of the captured images, quantify such relative amounts of hydrocarbons and injection mixture. In other words, in some implementations, this quantification may be largely qualitative and consist of a visual approximation by the operator. For example, hydrocarbons may be reflected on the images according to a first fluorescence (eg. orange) while the tracer in the injection mixture may be reflected on the images according to a second fluorescence (e.g. blue). In such example, the operator may visually approximate the amount of blue portions versus orange portions in the images, thereby approximating a percentage of hydrocarbons (and injection mixture) in the production mixture.

Alternatively, a processor may automatically (e.g., through software applications or subroutines) approximate the volumetric relationship between hydrocarbons and injection mixture in the production mixture. The processor may, for each image received, calculate the number of blue "pixels" (i.e. "picture elements" or the smallest piece of information in the image) and orange pixels in the image. Thus, the processor may calculate the percentage of hydrocarbons in the production mixture with the number of orange pixels relative to the total image pixel count. Likewise, the processor may calculate the percentage of injection mixture in the production mixture with the number of blue pixels relative to the total image pixel count.

The quantification of both hydrocarbons and injection mixture (production mixture) may be approximated over any given time period according to the analysis of multiple images. Further, if a total flow rate of the production mixture were known or measured at the producing communication interval, an estimate of production rate of the injection mixture from the interval could be made by the operator or processor. Images captured from multiple communication intervals producing fluid may allow a mapping of, for example, percentage flow of injection mixture per interval, as well as a volumetric injection mixture flow rate contribution of each interval to a total production mixture flow rate.

In certain embodiments, the downhole fluid detector may be inserted into the production wellbore multiple times to log the wellbore. For example, at some later point in time after a first logging run of the downhole fluid detector, if the relative amount of injection mixture detected varies, there may be benefit to reinserting the downhole fluid detector into the production wellbore again, to determine if the communication interval into which the injection mixture is entering the wellbore has changed. This could happen, for example after a remedial action has been taken, such as the remedial actions described in steps 430-434. Such an additional logging run may provide feedback of the success or failure of the remedial action taken. Alternatively, if a decision not to take a remedial action was made, reinsertion of the downhole fluid detector may reveal a change in where injection mixture is entering the production wellbore. Such additional logging runs may provide further identification of which communication interval or intervals took injection mixture, which gave up injection mixture, and the time of transit of the injection mixture from the injection wellbore to the production wellbore. This information may provide valuable information about the transmissibility and path the injected fluids are taking through the subterranean zone. Because of these advantages, certain implementations of method 400 may include continuously logging the production wellbore and capturing images indicating where the injection mixture enters the wellbore, and how that changes with time (i.e., different communication intervals may process through at different speeds depending on the permeability, viscosity, and other factors).

Continuing with method 400, whether a remedial action should be instigated based, at least in part, on the approximate quantity of injection mixture in the production mixture is determined at 426. As noted above, the well operator may determine, for instance, that greater than 90% injection mixture relative to the production mixture may indicate an inefficient secondary production operation, under the circumstances, or a possible short circuit scenario. If the predetermined maximum percentage is met or exceeded according to the previous quantification in 424, a remedial action may be taken.

Alternatively, if the predetermined maximum percentage is not met according to the previous quantification in 424, a remedial action may not be taken For instance, the well operator may determine that the benefits of the production of hydrocarbons along with the injection mixture at the predetermined percentage outweighs any possible short circuiting of the injection mixture between the injection wellbore and the production wellbore.

If the determination is made to instigate a remedial action at 426, a determination is made at 428 whether to isolate the communication interval in which the injection mixture is being received with the production mixture at a percentage higher than the predetermined maximum value. If the determination is made to isolate that communication interval, one or more plugs may be inserted into the production wellbore at 430. The plugs may be set in the production wellbore to isolate that communication interval from the remaining portions of the production wellbore at 432. This may substantially seal that communication interval and thereby at least partially prevent short circuiting of injection mixture into the production wellbore from that communication interval.

If the determination is made to refrain from isolating that communication interval at 428, an alternative remedial action may be taken by ceasing the pumping of the injection mixture into the injection wellbore at 434. At that time, further determinations may be made on how to prevent the short circuiting of the injection mixture while discontinuing inefficient secondary operations.

A number of implementations have been described. Nevertheless, it will be understood that various modifications may be made. For instance, the steps of method 400 may be performed in one or more different orders than that described, and one or more steps of method 400 may be performed simultaneously with one or more other steps of method 400. Further, one or more of the steps of method 400 may not be performed at all. For example, the illumination of the production mixture by ultraviolet light generated by the downhole fluid detector in 408 may not occur in some implementations of method 400. Further, the ultraviolet light generated in 408 may be generated by an apparatus or light source other than the downhole fluid detector. Additionally, although two different types of remedial actions are described in method 400, any other appropriate remedial actions to help prevent, at least in part, shot circuiting of injection mixture between the injection wellbore and the production wellbore may be utilized, such as expanding sleeves or utilization of resin or cement to seal the particular communication interval. As another example, the downhole fluid detector 24 may have a single light source that generates both visible and ultraviolet light or multiple light sources, each generating light at a distinct wavelength (e.g., either visible of ultraviolet). As a further example, the downhole fluid detector 24 may generate alternative forms of light, such as infrared light (e.g., near infrared light between 0.75-1.4 μm in wavelength).

Additionally, while the downhole fluid detector may be inserted into a production wellbore for multiple logging runs, in some embodiments, the detector may only log the wellbore once or twice. Thus, steps 412-422 of method 400 may be performed once, twice, or many more times, as needed. In some embodiments, since injection mixture from a single injection wellbore may be produced at multiple production wellbores, application of method 400 may include installation of surface detection of injection mixture at multiple production wellbores around the injection wellbore where tracer is injected. Thus, as injection mixture is detected at the production wellbores, the downhole fluid detector may be utilized at each production wellbore in turn to log that production wellbore. Such use of the downhole fluid detector may provide an inferred areal, as well as a vertical picture, of where the tracer material traveled through the subterranean zone.

Accordingly, other implementations are within the scope of the following claims.

What is claimed is:

1. A method for identifying fluids in a wellbore comprising:
   generating light in a visible spectrum from a light source in a production wellbore;
   generating light in an ultraviolet spectrum from the light source in the production wellbore;
   receiving a first fluid in the production wellbore from a subterranean zone;
   receiving a second fluid in the production wellbore from the subterranean zone;
   capturing at least one image of a combined flow of the first fluid and the second fluid in at least one of the visible spectrum and the ultraviolet spectrum with an optical receiver in the production wellbore; and
   distinguishing, at least in part through the image, the first fluid from the second fluid in either or both the visible and ultraviolet spectrums by quantifying, based on the at least one image, an amount of the first fluid or the second fluid in the combined flow of the first and second fluids in the production wellbore.

2. The method of claim 1, wherein generating light in a visible spectrum from a light source in a production wellbore comprises generating light in a visible spectrum from a first light source in a production wellbore, and generating light in an ultraviolet spectrum from the light source in the production wellbore comprises generating light in an ultraviolet spectrum from a second light source in the production wellbore.

3. The method of claim 1 further comprising transmitting the image from the optical receiver for presentation at the surface whereby it is visible to an operator.

4. The method of claim 1, wherein receiving a first fluid in the production wellbore and receiving the second fluid in the production wellbore comprises receiving the combined flow of the first fluid and the second fluid in the production wellbore at a first communication interval.

5. The method of claim 1 further comprising instigating a remedial action based at least in part on the quantification.

6. The method of claim 1, wherein quantifying, based on the at least one image, an amount of the first fluid or the second fluid in the combined flow of the first and second fluids in the production wellbore comprises:
transmitting a plurality of images of the mixture of the first and second fluids to a processor located at or near the surface; and
calculating, with the processor, an amount of the first fluid in the combined flow according to the plurality of images.

7. The method of claim 5, wherein instigating a remedial action comprises at least one of the following:
isolating the first communication interval in the production wellbore from a remaining portion of the production wellbore; or
substantially preventing the receipt of the second fluid at the production wellbore.

8. The method of claim 7, wherein isolating the first communication interval in the production wellbore from a remaining portion of the production wellbore comprises:
inserting at least one packer into the production wellbore;
setting the packer into the production wellbore proximate to the first communication interval in the production wellbore; and
at least partially isolating the first communication interval from the remaining portion of the production wellbore with the packer.

9. The method of claim 1, wherein the second fluid comprises at least one of water, carbon dioxide, nitrogen, or hydrocarbon gas and the first fluid comprises a hydrocarbon fluid.

10. The method of claim 1 further comprising targeting the optical receiver for a fluorescent spectrum of the second fluid.

11. The method of claim 1, wherein capturing at least one image of the combined flow of the first fluid and the second fluid comprises capturing a digital video image of the combined flow of the first fluid and the second fluid.

12. A downhole wellbore apparatus, comprising:
a light source that generates light in a visible spectrum in a production wellbore and light in an ultraviolet spectrum in the wellbore; and
an optical receiver that captures at least one image in the visible spectrum of a mixture of a first fluid and a second fluid in the wellbore, the optical receiver adapted to distinguish, at least in part through the image, the first fluid from the second fluid in the ultraviolet spectrum, wherein the optical receiver is adapted to distinguish, based at least in part on the at least one image, the first fluid from the second fluid in a combined flow of the first and second fluids in the production wellbore, wherein the first fluid comprises a hydrocarbon and the second fluid comprises a tracer fluid and at least one of water, carbon dioxide, or nitrogen, the hydrocarbon comprising a first fluorescence and the tracer fluid comprising a second fluorescence.

13. The apparatus of claim 12, wherein the light source that generates light in a visible spectrum is a first light source, the apparatus further comprising a second light source that generates light in an ultraviolet spectrum in the wellbore.

14. The apparatus of claim 12, wherein the optical receiver is further adapted to transmit the at least one image to a processor located at or near the surface.

15. The apparatus of claim 12, wherein the optical receiver comprises a digital video camera adapted to capture a plurality of images in the visible spectrum or ultraviolet spectrum of the mixture of the first fluid and the second fluid in the wellbore.

16. The apparatus of claim 12, wherein the at least one image distinguishes the first fluorescence from the second fluorescence.

17. A system for identifying communication paths between wellbores, comprising:
a production wellbore extending from a surface to a subterranean zone;
at least one injection wellbore extending from the surface to the subterranean zone;
a marking fluid communicable from the injection wellbore to the production wellbore through the subterranean zone; and
a downhole tool adapted to be inserted into the production wellbore comprising:
a first light source that generates light in a visible spectrum;
a second light source that generates light in an ultraviolet spectrum; and an optical receiver that captures at least one image in the visible spectrum of a mixture of a hydrocarbon fluid and the marking fluid in the production wellbore, the optical receiver adapted to distinguish, at least in part through the image, the hydrocarbon fluid from the marking fluid in the ultraviolet spectrum.

18. The system of claim 17, further comprising a processor located at the surface, the downhole tool adapted to transmit the image to the processor, the processor adapted to quantify, based on the image, an amount of the hydrocarbon fluid or the marking fluid in the mixture of the hydrocarbon fluid and the marking fluid in the production wellbore.

19. The system of claim 17, wherein the optical receiver comprises a digital video camera adapted to capture a plurality of video images in the visible spectrum or ultraviolet spectrum of the mixture of the hydrocarbon fluid and the marking fluid in the production wellbore.

20. The system of claim 17, wherein the hydrocarbon fluid comprises a first fluorescence and the marking fluid comprises a second fluorescence.

21. The system of claim 20, wherein the image distinguishes the first fluorescence from the second fluorescence.

22. A method for identifying fluids comprising:
generating light in a visible spectrum from a light source at a surface site for hydrocarbon production;
generating light in an ultraviolet spectrum from the light source at the surface site;

receiving a first fluid at the surface site from a production wellbore;

receiving a second fluid at the surface site from the production wellbore;

capturing at least one image of a combined flow of the first fluid and the second fluid in at least one of the visible spectrum and the ultraviolet spectrum with an optical receiver at the surface site;

distinguishing, at least in part through the image, the first fluid from the second fluid in either or both the visible and ultraviolet spectrums;

qualitatively determining, based on the at least one image, an amount of the first fluid or the second fluid in the combined flow of the first and second fluids; and based on the amount, inserting the light source and the optical receiver into the production wellbore.

23. The method of claim 22, wherein inserting the light source and the optical receiver into the production wellbore based on the amount comprises:

comparing the amount to a predetermined threshold value of the first fluid or the second fluid in the combined flow of the first and second fluids; and inserting the light source and the optical receiver into the production wellbore if the amount of the first fluid or the second fluid exceeds the threshold value.

24. A method for identifying fluids in a wellbore comprising:

generating light in an ultraviolet spectrum from a light source in a production wellbore;

receiving a first fluid in the production wellbore from a subterranean zone;

receiving a second fluid in the production wellbore from the subterranean zone;

capturing at least one image of a combined flow of the first fluid and the second fluid in the ultraviolet spectrum with an optical receiver in the production wellbore; and distinguishing, at least in part through the image, the first fluid from the second fluid in the ultraviolet spectrum, by quantifying, based on the image, an amount of the first fluid or the second fluid in the combined flow of the first and second fluids in the production wellbore.

* * * * *